US008717656B2

(12) United States Patent
Shimizu et al.

(10) Patent No.: US 8,717,656 B2
(45) Date of Patent: May 6, 2014

(54) OPTICAL SCANNING DEVICE

(75) Inventors: Kohei Shimizu, Ebina (JP); Mitsuru Nakajima, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 553 days.

(21) Appl. No.: 12/561,142

(22) Filed: Sep. 16, 2009

(65) Prior Publication Data
US 2010/0067080 A1    Mar. 18, 2010

(30) Foreign Application Priority Data

Sep. 17, 2008  (JP) ................................. 2008-237781
Sep. 17, 2008  (JP) ................................. 2008-237784

(51) Int. Cl.
*G02B 26/08*    (2006.01)
*G02B 26/10*    (2006.01)
*G02B 26/12*    (2006.01)

(52) U.S. Cl.
USPC ....................................................... 359/204.1

(58) Field of Classification Search
USPC ........................................... 359/196.1–226.3
See application file for complete search history.

(56) References Cited

U.S. PATENT DOCUMENTS

| 6,133,566 | A * | 10/2000 | Yamaguchi | .................... | 250/234 |
| 6,549,228 | B1 | 4/2003 | Watanabe | | |
| 6,621,512 | B2 | 9/2003 | Nakajima et al. | | |
| 6,961,077 | B2 | 11/2005 | Makino | | |
| 2001/0014108 | A1 | 8/2001 | Naoe | | |
| 2001/0019564 | A1 | 9/2001 | Okuwaki et al. | | |
| 2002/0001118 | A1 * | 1/2002 | Nakajima et al. | ............. | 359/204 |
| 2004/0057096 | A1 * | 3/2004 | Amada et al. | ................. | 359/204 |
| 2006/0114578 | A1 | 6/2006 | Nakajima et al. | | |
| 2007/0103737 | A1 | 5/2007 | Nakajima | | |
| 2007/0216754 | A1 * | 9/2007 | Miyatake | ....................... | 347/242 |
| 2007/0253731 | A1 | 11/2007 | Nakajima | | |
| 2008/0117486 | A1 | 5/2008 | Andoh et al. | | |

FOREIGN PATENT DOCUMENTS

| JP | 8-82759 | A | 3/1996 |
| JP | 09-054263 | A | 2/1997 |
| JP | 10-010447 | A | 1/1998 |
| JP | 10-319338 | A | 12/1998 |
| JP | 2000-075227 | A | 3/2000 |
| JP | 2000-098278 | A | 4/2000 |
| JP | 2000-206428 | A | 7/2000 |
| JP | 2001-013432 | A | 1/2001 |
| JP | 2001-033718 | A | 2/2001 |
| JP | 2001-066538 | A | 3/2001 |
| JP | 2002-166598 | A | 6/2002 |
| JP | 2002-172815 | A | 6/2002 |
| JP | 2002-182141 | A | 6/2002 |

(Continued)

*Primary Examiner* — Stephone B Allen
*Assistant Examiner* — Kimberly N Kakalec
(74) *Attorney, Agent, or Firm* — Dickstein Shapiro LLP

(57) ABSTRACT

The optical scanning device scans an object with plural laser beams, and includes a light source, which emits plural parallel laser beams in a predetermined direction and which has a stem portion having a first notch; and a support having an opening, with which the light source is engaged so as to be rotatable on an axis parallel to the plural light beams, and a second notch located on a part of the opening so as to overlap with the first notch when the light source is engaged with the opening. By inserting a slotted screwdriver, etc., into the space formed by the two notches and rotating the screwdriver, the angle of the light source can be adjusted and thereby the pitches of the laser beams can be adjusted.

13 Claims, 15 Drawing Sheets

(56) References Cited

FOREIGN PATENT DOCUMENTS

| JP | 2002-189182 A | 7/2002 |
|----|---------------|--------|
| JP | 2002-287055 A | 10/2002 |
| JP | 2003-315719 A | 11/2003 |
| JP | 2005-093599 A | 4/2005 |
| JP | 2005-305950 A | 11/2005 |
| JP | 2007-028509 A | 2/2007 |
| JP | 2007-151108 A | 6/2007 |
| JP | 2008-139663 A | 6/2008 |

* cited by examiner

OPTICAL SCANNING DEVICE

BACKGROUND OF THE INVENTION

1. Field of the Invention

The present invention relates to an optical scanning device, which scans an object with a light beam.

2. Discussion of the Related Art

Image forming apparatus using the Carlson process typically perform the following processes:
(1) scanning a rotated photoreceptor drum with a light beam to form an electrostatic latent image thereon;
(2) developing the electrostatic latent image with a developer including a toner to form a toner image on the photoreceptor drum;
(3) transferring the toner image onto a receiving material; and
(4) fixing the toner image on the receiving material, resulting in formation of a hard copy.

Recently, these image forming apparatus have been used for on-demand printing systems (i.e., for simplified printing fields). Therefore, a need exists for an image forming apparatus which can produce high-density images at a high speed.

In attempting to fulfill the need, image forming apparatus, which have a light source capable of emitting plural light beams such as multi-beam laser diodes, and light sources (e.g., vertical cavity surface emitting laser (VCSEL)) in which plural emitting regions are two dimensionally arranged monolithically, have been proposed. The image forming apparatus can scan an object with plural laser beams emitted by the light source, i.e., can perform plural line scanning at the same time.

Optical scanning devices, in which a light source emitting plural light beams is rotated on an optical axis of a scanning optics system of the devices to adjust the beam pitch of the emitted light beams, are used for such image forming apparatus. In this regard, various proposals have been made for such beam pitch adjustment, for example, by published unexamined Japanese patent applications Nos. (hereinafter referred to as JP-As) 2001-13432 and 2002-182141.

When the beam pitch of laser beams is adjusted by rotating the light source unit using the technique disclosed in JP-A 2001-13432, a problem in that when fastening the light source unit using a screw, the unit is unnecessarily moved (rotated), resulting in deviation from the desired position of the light source unit, tends to be caused. Deviation from the desired position of the light source unit causes deviation of position of the light beams (light spots) in the sub-scanning direction, resulting in deterioration of scanning precision of the optical scanning device.

Specifically, in a case where two parts A and B are subjected to positional adjustment, and then the parts are fastened with screws, the following method is generally used. Namely, the method typically includes the following steps: (1) one of the parts (for example, the part A) is fixed; (2) the other part B is born with a chuck, which has an adjustment device and which is connected with the fixed part A, for example, via the ground, and then the position of the part B is adjusted by rotating the part B; (3) after the position is adjusted, the part B is fastened and then the chuck is released from the part B, thereby fastening the parts A and B.

In this case, since the part B, which is a part of a structure, is born with a member (i.e., chuck) other than the parts of the structure, interference is caused due to the force of fastening the part B and the force of the chuck, and thereby variation is caused when the chuck is released, resulting in variation in position of the fastened parts A and B. In addition, when the fastening operation is performed, the two parts A and B are moved relatively due to the torque of the screws, resulting in variation in position of the fastened parts.

Further, in a case where the positions of the two parts A and B are adjusted while the parts are loosely fastened (hereinafter referred to as temporary fastening), the parts can move relatively when starting the fastening operation. In this regard, as the parts A and B are fastened, the parts are minutely transited to the fastened state. Therefore, variation in position (relative position) of the two parts inevitably occurs. In order to reduce such variation, the two parts are preferably fastened as strongly as possible in the temporary fastened state in such an extent that the parts can be relatively moved, and then the positional adjustment operation is performed. However, as the two parts are fastened more strongly, it becomes more difficult to move the parts in the positional adjustment operation.

In this case, if the firmly fastened two parts do not satisfy the desired positional relationship, the parts are loosened again, and then the adjustment operation is performed again. These operations are performed until the two parts satisfy the desired positional relationship. Therefore, the adjustment operation takes a long time, resulting in deterioration of productivity.

In the technique disclosed in 2002-182141, the light source unit is held with a wire material without using a screw clamp mechanism to prevent occurrence of the positional deviation problem of the light source unit. However, in order that the light source unit rotates, it is necessary to form a small gap between the light source unit and the structure. In this case, a problem in that the beam pitch is deviated in an amount corresponding to the gap due to vibration or the like even after the positional adjustment operation tends to occur.

On the other hand, JP-As2000-98278, 2000-75227, 2007-28509 and 2001-228418 have disclosed optical scanning devices in which a laser diode emitting one or more laser beams is held with a holder. The light source unit can be easily rotated via the holder. In addition, the light source unit can be easily subjected to positional adjustment by being moved in the direction perpendicular to the optical axis of the optics system. However, it is difficult to arrange two or more light source units so that the light source units are closely adjacent to each other in the sub-scanning direction. This is because the holder used is relatively large compared to the laser diodes used for the light source unit. Therefore, when the light source units are arranged in such a manner that the laser diodes therein are close to each other, the holders thereof interfere when the laser diodes are rotated. Therefore, in optical scanning devices used for tandem image forming apparatus having plural photoreceptors, the plural light sources have to be separated in the main scanning direction, resulting in jumboization of the image forming apparatus.

Because of these reasons, a need exists for a small sized optical scanning device in which the beam pitch adjustment can be easily performed precisely.

SUMMARY OF THE INVENTION

As an aspect of the present invention, an optical scanning device is provided. The optical scanning device scans an object with plural laser beams, and includes:

a light source configured to emit plural parallel laser beams in a predetermined direction, wherein the light source has a stem portion having a first notch; and a support which has an opening, with which the light source is engaged so as to be rotatable on an axis parallel to the plural light beams, and a second notch, which is located on a part of the opening so as to overlap with the first notch when the light source is engaged with the opening.

Alternatively, the optical scanning device may include:

a light source configured to emit plural parallel laser beams in the predetermined direction, wherein the light source has a stem portion having a first engaging portion;

a support configured to support the light source so that the light source is rotatable on an axis parallel to the plural light beams, wherein the support has a first notch; and a holding member, which is attached to the support and which has a second notch and a second engaging portion, wherein the holding member holds the light source while the second engaging portion is engaged with the first engaging portion of the stem portion of the light source, wherein when the holding member is attached to the support, the first notch of the support and the second notch of the holding member are located so as to overlap.

Alternatively, the optical scanning device may include:

a light source configured to emit plural parallel laser beams in the predetermined direction;

an optics system configured to shape the plural laser beams;

a base member configured to hold the light source and the optics system, wherein the base member has a first notch; and a support configured to support the base member, wherein the support has a second notch located so as to overlap the first notch when the base member is supported by the support.

Another aspect of the present invention, an image forming apparatus is provided. The image forming apparatus includes:

a photoreceptor configured to bear an electrostatic latent image thereon;

the above-mentioned optical scanning device, which scans the surface of the photoreceptor with plural laser beams to form the electrostatic latent image on the photoreceptor;

a developing device configured to develop the electrostatic latent image with a developer including a toner to form a toner image on the photoreceptor;

a transferring device configured to transfer the toner image onto a receiving material; and a fixing device configured to fix the toner image on the receiving material.

These and other objects, features and advantages of the present invention will become apparent upon consideration of the following description of the preferred embodiments of the present invention taken in conjunction with the accompanying drawings.

DESCRIPTION OF THE PREFERRED EMBODIMENTS

At first, a first embodiment of the present invention will be explained by reference to FIGS. 1-11.

Figure 1:
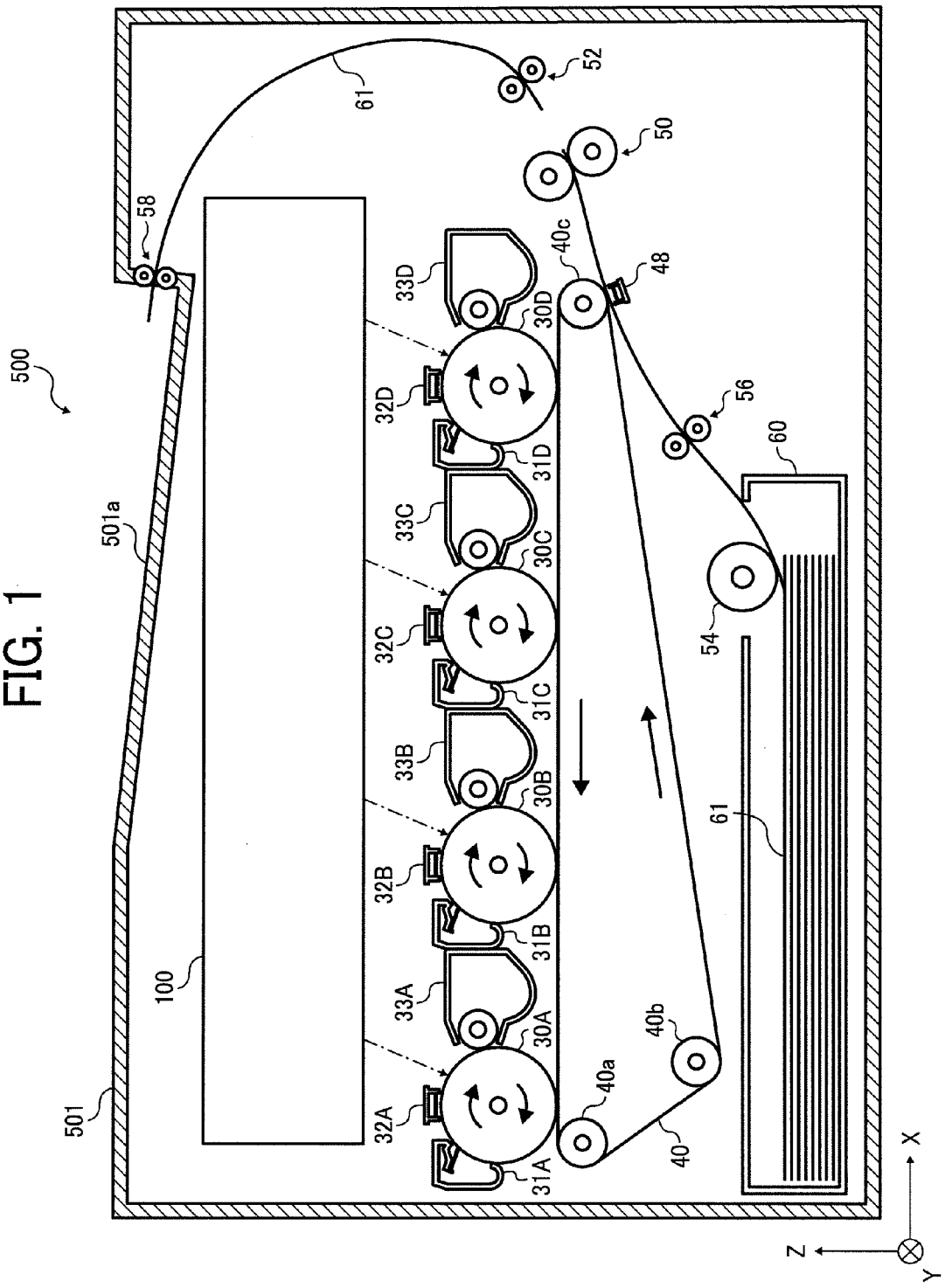
FIG. 1 is a schematic view illustrating an example of the image forming apparatus of the present invention.

FIG. 1 is a schematic view illustrating an image forming apparatus 500 according to an example of the present invention.

The image forming apparatus 500 is a tandem color printer, which produces multi-color images by transferring black, yellow, magenta and cyan color toner images on a receiving material sheet such as paper sheets so that the color toner images are overlaid. As illustrated in FIG. 1, the image forming apparatus 500 includes an optical scanning device 100, four photoreceptor drums 30A, 30B, 30C and 30D, a transfer belt 40, a receiving material tray 60, a feeding roller 54, first registration rollers 56, second registration rollers 52, fixing rollers 50, discharging rollers 58, a controller (not shown) controlling the above-mentioned devices, a housing 501 containing the devices therein, etc.

On an upper surface of the housing 501, a discharge tray 501a is formed to receive receiving materials sheets bearing printed images thereon and discharged by the discharging rollers 58. The optical scanning device 100 is located below the discharge tray 501a.

The optical scanning device 100 emits laser beams modulated by black color image data of image information supplied from a host device such as personal computers to scan the photoreceptor drum 30A with the laser beams. In addition, the optical scanning device emits laser beams respectively modulated by cyan, magenta and yellow color image data to scan the respective photoreceptor drums 30B, 30C and 30D with the laser beams. The configuration of the optical scanning device 100 will be explained later in detail.

The photoreceptors 30A-30D are a cylindrical member having a photosensitive layer thereon, and are arranged at regular intervals in an X direction. When the optical scanning device 100 scans the photoreceptors 30A-30D with respective laser beams, the irradiated portions of the photosensitive layers of the photoreceptors become electroconductive, resulting in formation of electrostatic latent images corresponding to the black, cyan, magenta and yellow color images on the respective photoreceptors.

As illustrated in FIG. 1, the photoreceptor drum 30A is located at the end of the image forming apparatus 500 in the X direction and extends in a Y direction (i.e., the longitudinal direction of the photoreceptor 30A is parallel to the Y direction). The photoreceptor drum 30A is rotated by a rotating mechanism in a direction indicated by arrows. Around the photoreceptor drum 30A, a charger 32A (located at the 12 o'clock position) configured to charge the surface of the photoreceptor drum, a developing device 33A (located at the 2 o'clock position) configured to develop an electrostatic latent image on the photoreceptor drum with a developer including a toner to form a toner image thereon, and a cleaner 31A (located at the 10 o'clock position) configured to clean the surface of the photoreceptor, are arranged in the clockwise direction.

The charger 32A extends in the Y direction and is arranged so that a predetermined clearance is formed between the surface of the photoreceptor 30A and the surface of the charger. The charger 32A charges the photoreceptor drum 30A by applying a predetermined voltage thereto.

The developing device 33A includes a toner cartridge containing a black toner therein, a developing roller to which a voltage having a polarity opposite to that of the voltage applied to the photoreceptor 30A, etc. In this regard, the toner is supplied to the surface of the photoreceptor 30A via the developing roller.

The cleaner 31A includes a cleaning blade extending in the Y direction, which is arranged in such a manner that the tip of the blade is contacted with the surface of the photoreceptor drum 30A. Toner particles remaining on the surface of the photoreceptor drum 30A even after a toner image is transferred onto a receiving material are removed from the photoreceptor drum by the blade. The collected toner particles are contained in the cleaner 31A.

The photoreceptor drums 30B, 30C and 30D have the same configuration as the photoreceptor drum 30A, and are arranged side by side in the +X direction at regular intervals. Around the photoreceptor drums 30B, 30C and 30D, respective chargers 32B, 32C and 32D, developing devices 33B, 33C and 33D, and cleaners 31B, 31C and 31D are arranged. The functions of the chargers 32B, 32C and 32D, the developing devices 33B, 33C and 33D, and the cleaners 32B, 32C and 32D are the same as those of the charger 32A, the developing device 33A and the cleaner 31A, respectively.

Hereinafter, the combination of the photoreceptor 30A, charger 32A, developing device 33A and cleaner 31A is referred to as a first station. Similarly, the combination of the photoreceptor 30B (30C or 30D), charger 32B (32C or 32D), developing device 33B (33C or 33D), and cleaner 31B (31C or 31D) is referred to as a second (third or fourth) station.

The transfer belt 40 is an endless member, which is located below the photoreceptors 30A-30D and which is rotated by a driving roller 40b and driven rollers 40a and 40c located above the driving roller while tightly stretched by the three rollers. The transfer belt 40 is rotated in a direction indicated by arrows while the upper surface of the transfer belt is contacted with the surfaces of the four photoreceptors 30A-30D. A transfer charger 48 is provided at the right end of the transfer belt to apply a voltage having a polarity opposite to that of the voltage applied to the chargers 32 so that the color toner images on the transfer belt 40 are easily transferred onto a receiving material sheet.

The receiving material tray 60 has a rectangular form and is arranged below the transfer belt 40. The tray 60 contains sheets 61 of a receiving material. The tray 60 has a rectangular opening at the end thereof in the +X direction, through which the sheets 61 are fed to the first registration rollers 56.

The feeding roller 54 feeds the sheets 61 one by one from the tray 60 toward a gap (transfer gap), which is formed by the transfer belt 40 and the transfer charger 48, via the first registration rollers 56. Color toner images (i.e., a combined color toner image) on the transfer belt 40 are transferred onto one of the sheets 61 at the transfer gap.

The sheet 61 bearing the combined color toner image thereon is then fed to the fixing rollers 50. The fixing rollers 50 heat the sheet 61 while applying a pressure thereto, resulting fixation of the toner image on the sheet 61. The sheet 61 bearing the print image thereon is then fed to the discharging rollers 58 by the second registration rollers 52. The sheet 61 bearing the print image thereon is then discharged to the discharge tray 501a by the discharging rollers 58, which are a pair of rollers, resulting in stacking of the receiving material sheets 61 (copy sheets) on the discharge tray.

Next, the configuration of the optical scanning device 100 will be explained.

Figure 2:
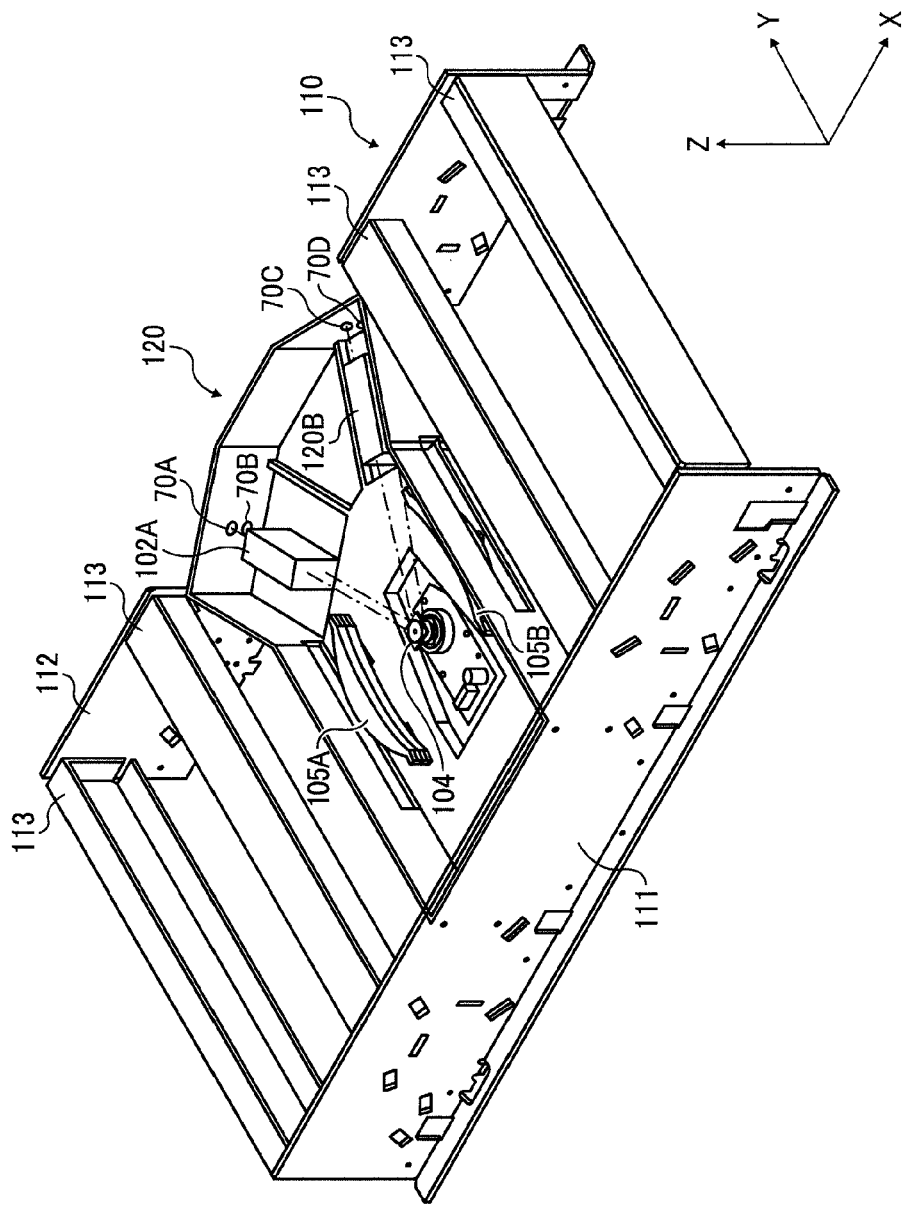
FIG. 2 is a perspective view illustrating the optical system of an optical scanning device of the image forming apparatus illustrated in FIG. 1.
Figure 3:
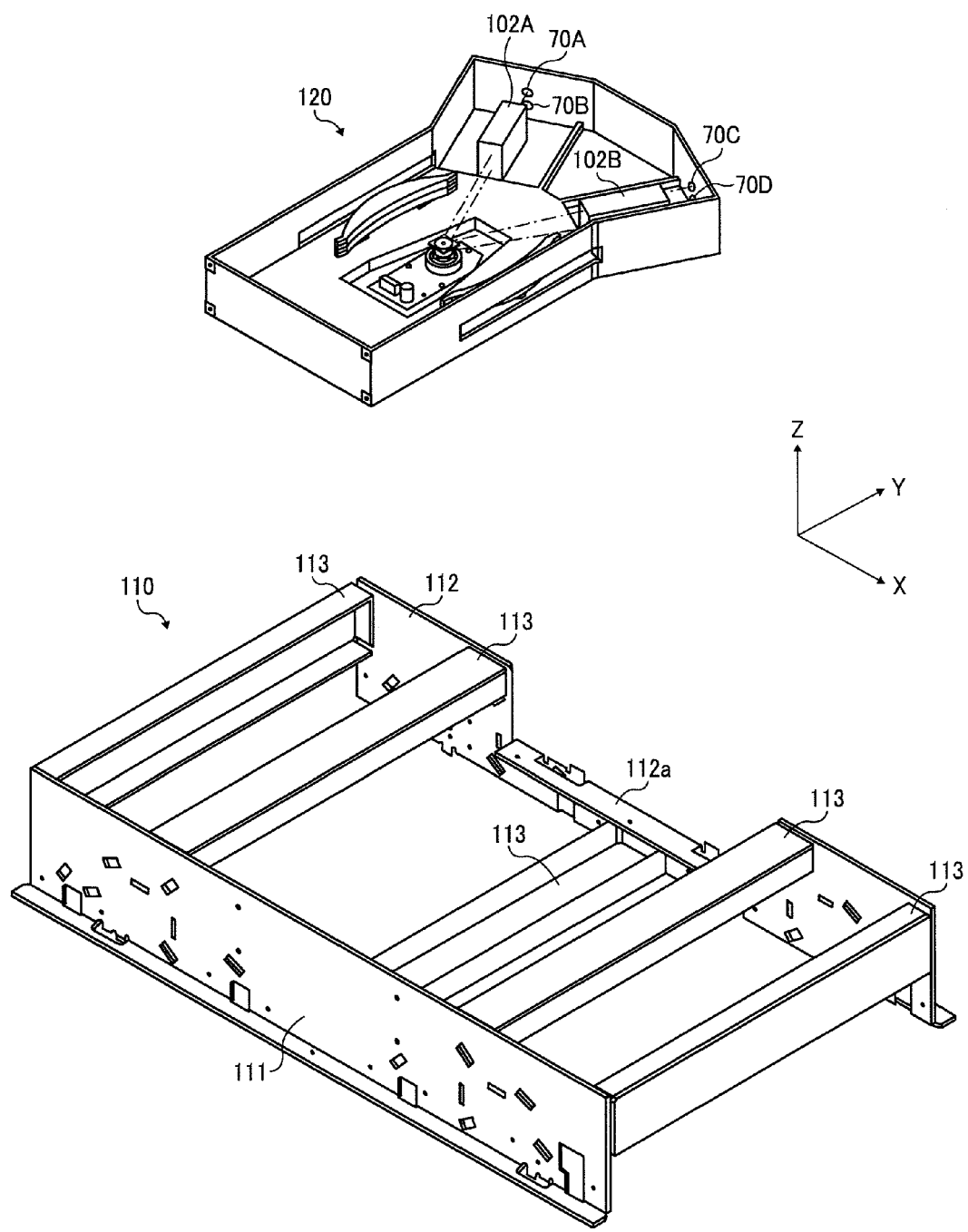
FIG. 3 is an exploded view of the optical system illustrated in FIG. 2.

FIG. 2 is a perspective view illustrating the optical system of the optical scanning device 100, and FIG. 3 is an exploded view of the optical system. As illustrated in FIGS. 2 and 3, the optical scanning device 100 includes a core unit 120 in which light sources 70A/70B and 70C/70D are attached to a housing thereof serving as a support; and a sub unit 110 including an optical system, which guides the laser beams emitted by the core unit 120, to the photoreceptor drums 30.

Figure 4:
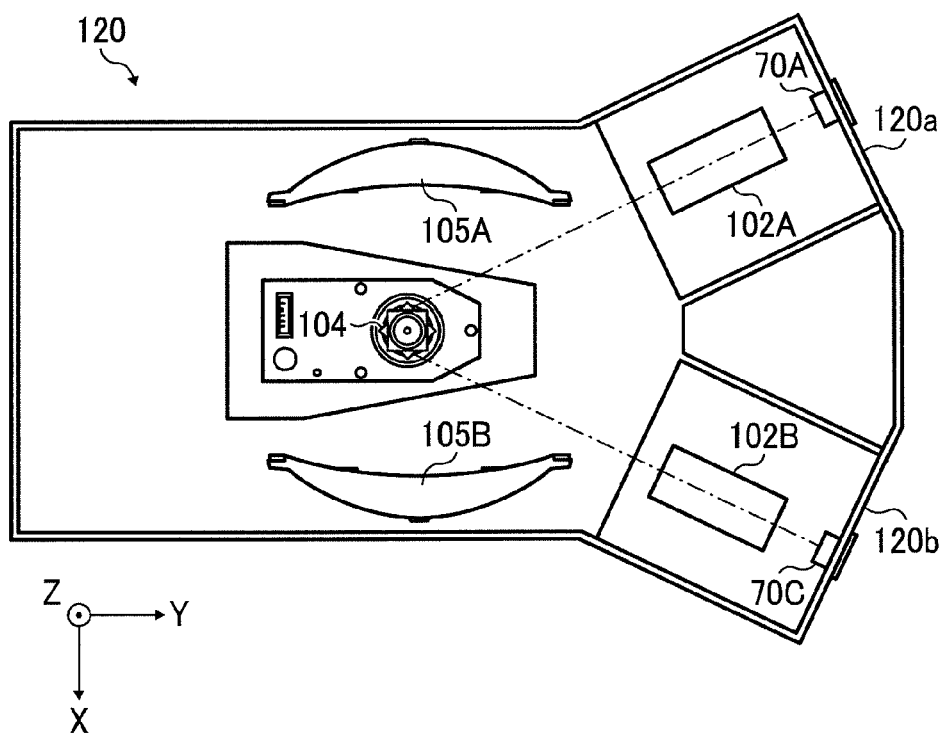
FIG. 4 is a plan view illustrating the core unit of the optical system illustrated in FIG. 2.

FIG. 4 is a plan view illustrating the core unit 120. Referring to FIG. 4, the core unit 120 is made of an aluminum die casting including a first portion containing a polygon mirror 104 serving as a deflecting member, and a pair of scanning lenses 105A and 105B; and a second portion including optical units 102A and 102B. The core unit 120 has two external walls 120a and 120b, which are slanted at an angle of 30° relative to the X-Z plane. The light sources 70A and 70B are attached to the external wall 120a and the light source 70C and 70D are attached to the external wall 120b.

Hereinafter the optical scanning device will be explained by defining the normal direction of the external wall 120b as a y-axis direction.

Figure 5:
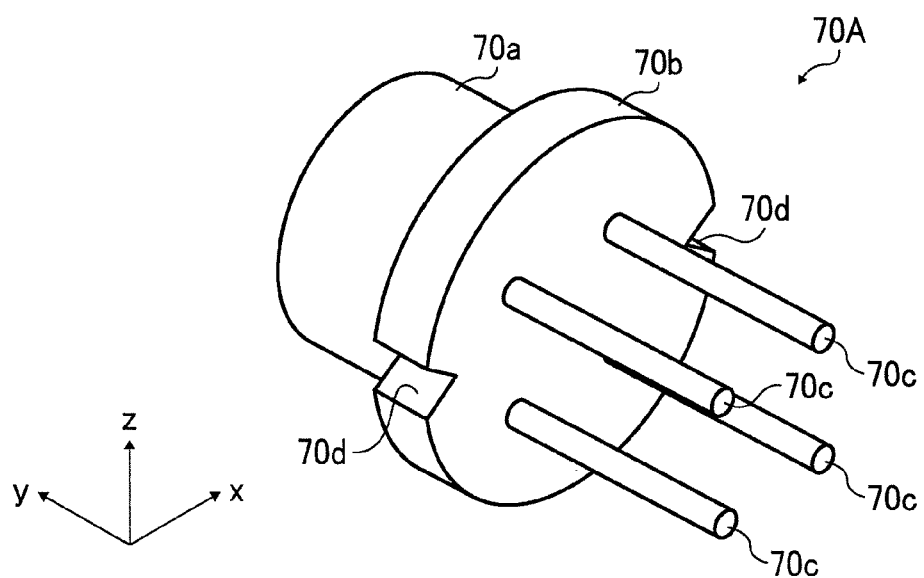
FIG. 5 is a view illustrating an engaging portion provided on the housing of the core unit illustrated in FIG. 4.
Figure 7:
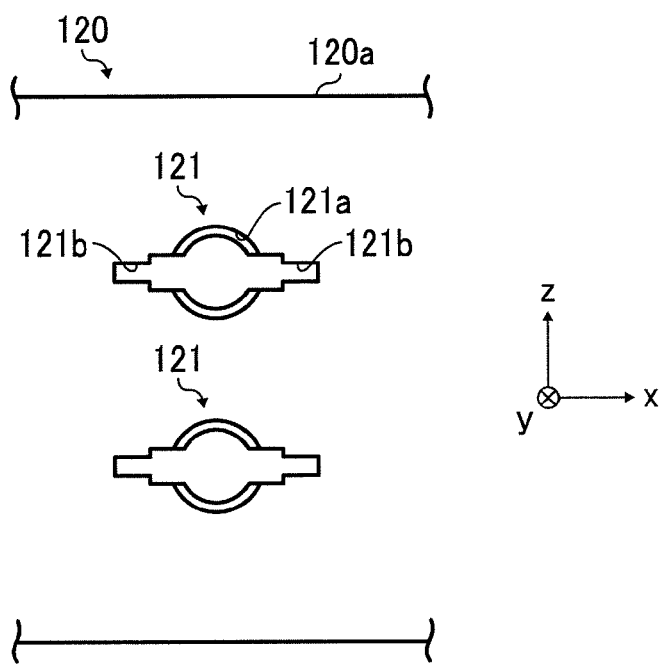
FIG. 7 is a view used for explaining the way to attach the light source to the housing of the core unit.

FIG. 7 is a view illustrating the external wall 120a of the core unit 120. Referring to FIG. 7, the external wall 120a has engaging portions 121, which are arranged side by side in a sub-scanning direction (i.e., z-axis direction) and with which the light sources 70a and 70b are to be engaged respectively. Each of the engaging portions 121 includes a stepped circular opening 121a and T-form notches 121b formed on the end portions of the circular opening 121a in the +x and −x directions, FIG. 5 is a perspective view illustrating the light source 70A. Each of the light sources 70A and 70B is a multi-beam laser diode emitting two parallel laser beams. Each of the light sources 70A and 70B has a cylindrical portion 70a having a diameter smaller than the inside diameter of the stepped circular opening 121a, a stem portion 70b having almost the same diameter as the larger diameter of the stepped circular opening 121a, and four lead terminals 70c extending in a −y direction. The stem portion 70b has V-form notches 70d at the end portions thereof in the +x and −x directions.

Figure 6:
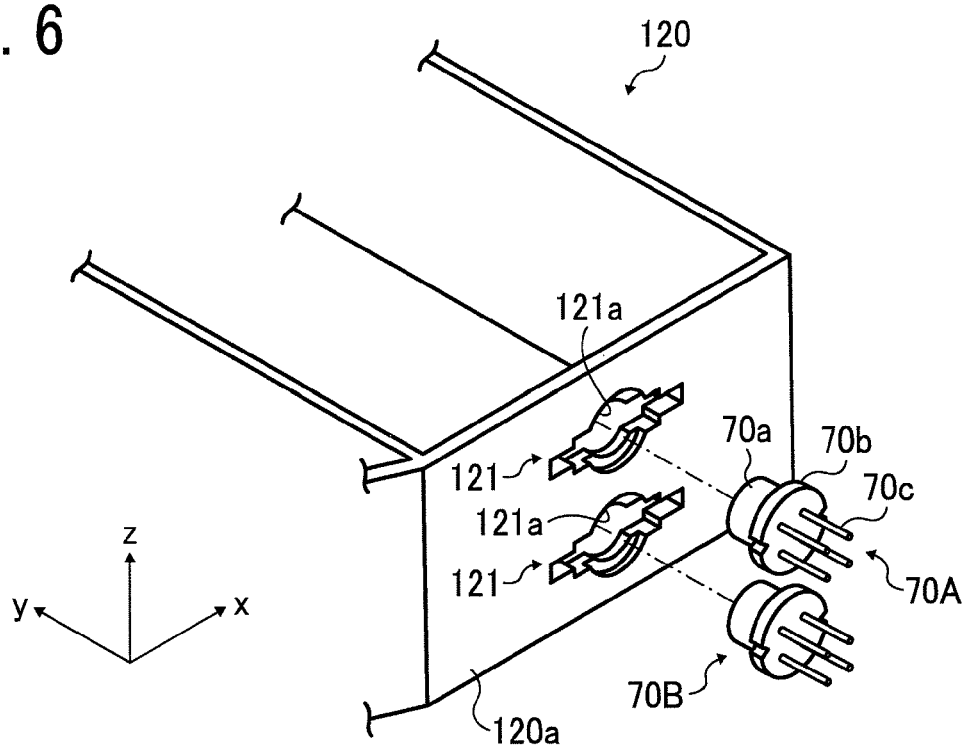
FIG. 6 is a perspective view illustrating a light source for use in the optical system illustrated in FIG. 2.

As illustrated in FIG. 6, the light sources 70A and 70B are attached to the external wall 120a from the −y side such that the stem portions 70b of the light sources are inserted into the respective stepped circular openings 121a. In this case, the stem portions 70b of the light sources are contacted with the stepped portions of the openings 121a.

Figure 8:
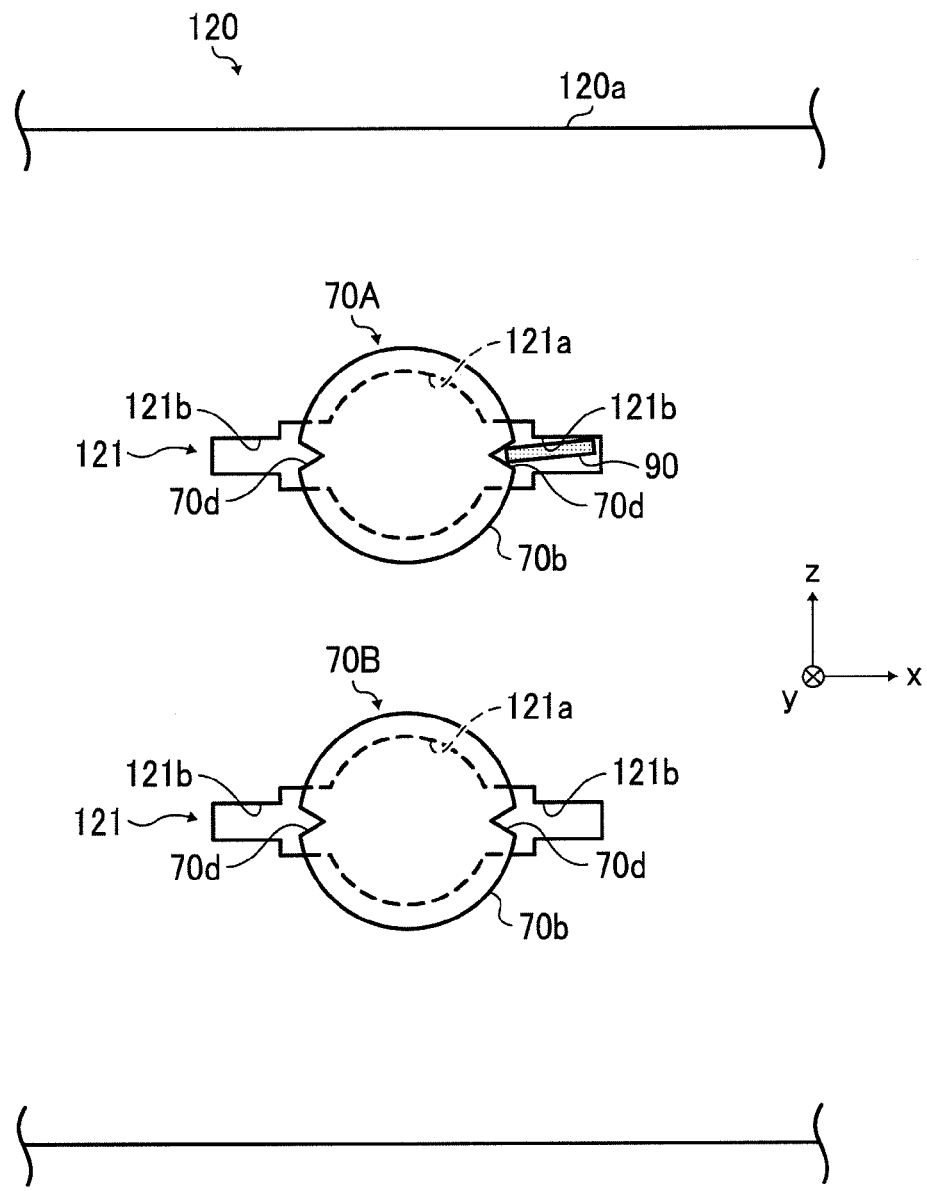
FIG. 8 is a view used for explaining how the light source is rotated.

When the light sources 70A and 70B are attached to the respective engaging portions 121 as illustrated in FIG. 8, the notches 70d located so as to overlap with the corresponding notches 121b of the engaging portions 121. In this case, by inserting, for example, a slotted screwdriver 90 into a space formed by the notch 70d and the notch 121b and rotating the screwdriver, the angle of each of the light sources to an axis parallel to the y-axis can be adjusted. By adjusting the angle of each of the light sources 70A and 70B, the pitches of the laser beams emitted by each light source can be adjusted.

Hereinafter, the method for adjusting the pitch of the laser beams emitted by the light source 70A will be explained (the method for adjusting the pitch of the laser beams emitted by the light source 70B is the same).

Figure 9A:
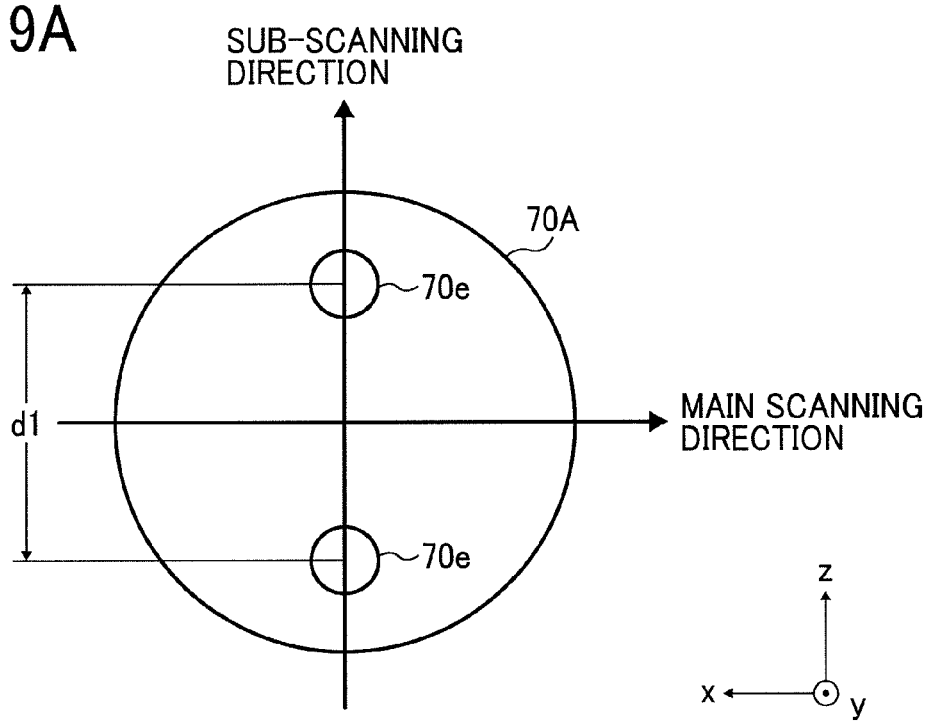
FIGS. 9A and 9B are views used for explaining the way to adjust the pitch of laser beams.
Figure 9B:
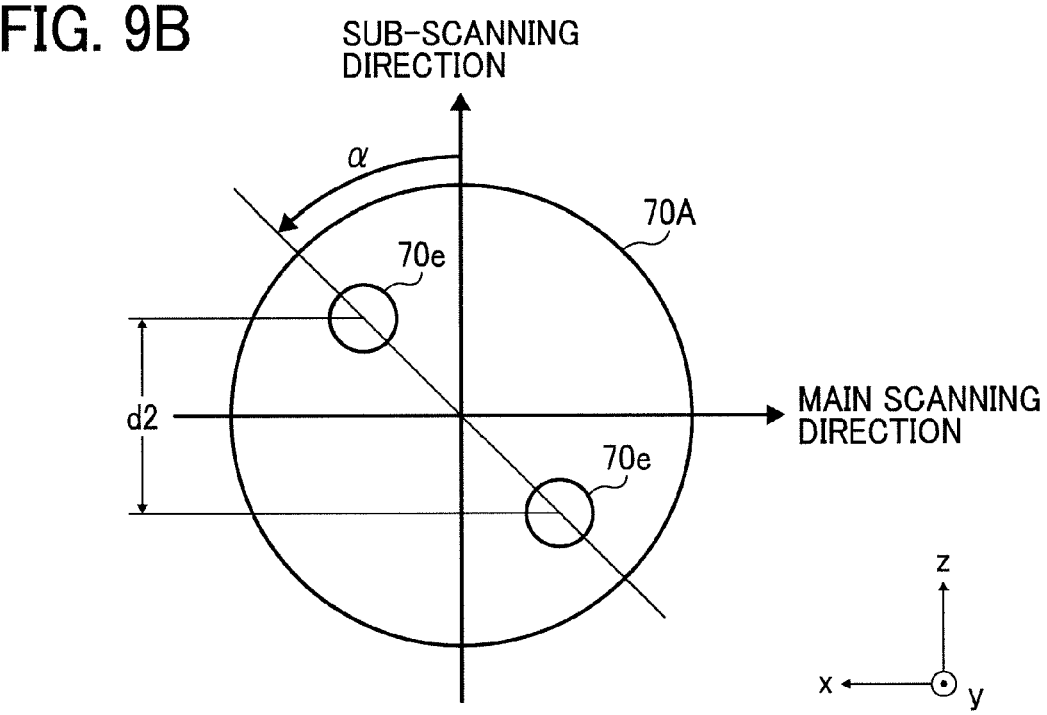

FIGS. 9A and 9B illustrate the light source 70A from the +y side. As illustrated in FIG. 9A, two laser emitting portions 70e and 70e are formed on a line passing the center of the light source, wherein the lengths between the two laser emitting portions and the center are the same (i.e., d1/2). In this embodiment, by rotating the light source A on an axis (rotation axis) parallel to the y-axis, the distance between the two laser beams in the sub-scanning direction can be adjusted, resulting in adjustment of the pitch of the laser beams. For example, when the light source 70A is counterclockwise rotated at an angle of α as illustrated in FIG. 9B, the distance between the two light emitting portions 70e and 70e in the sub-scanning direction is changed from d1 to d2.

Figure 10A:
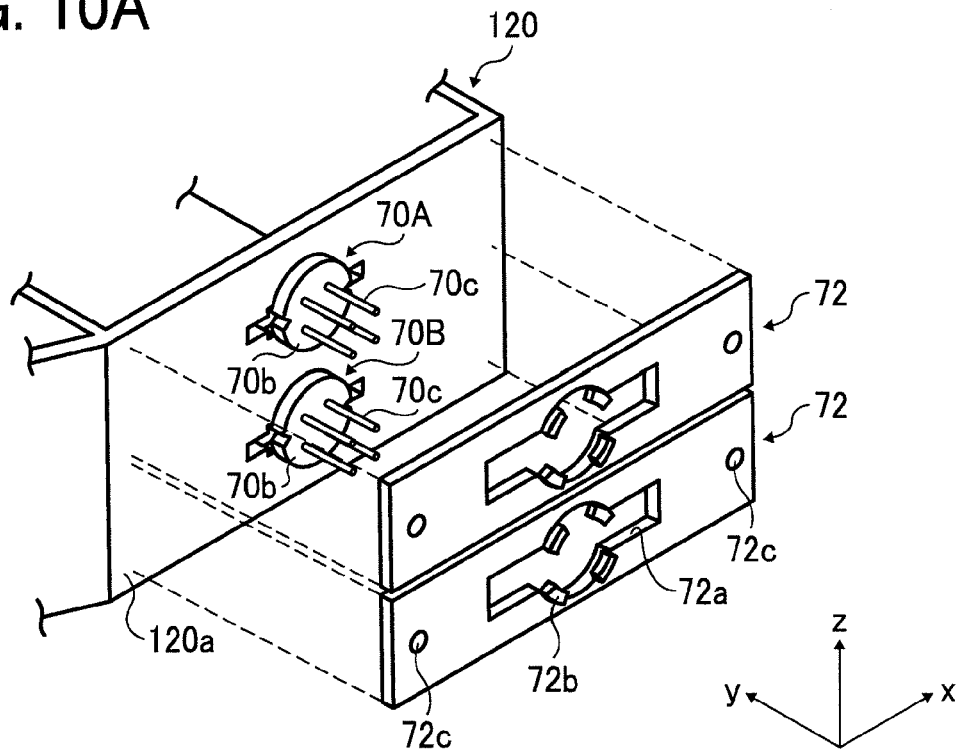
FIGS. 10A and 10B are views used for explaining the way to attach the holding member.
Figure 10B:
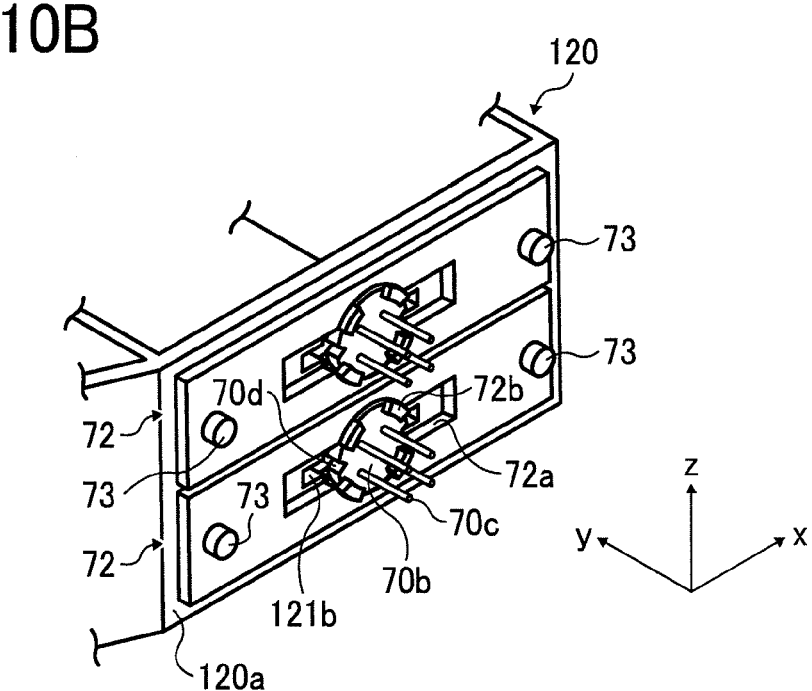

In this embodiment, after the light sources 70A and 70B are attached to the external wall 120a of the core unit 120, holders 72 are attached to the external wall 120a. As illustrated in FIGS. 10A and 10B, the holders 72 are a rectangular plate extending in the x direction. Each of the holders 72 has an opening 72a, and two circular holes 72c and 72c on both end portions thereof. In addition, four locking members 72b having a sector form are formed around the opening 72a.

As illustrated in FIG. 10B, after the opening 72a of the holder 72 is engaged with the light source 70A, the holder 72 is fixed to the external wall 120a using screws 73 and 73 which are engaged with the external wall through the circular holes 72c and 72c. In this case, the stem portion 70b of the light source 70A is locked with the locking members 72b, and thereby the stem portion is sandwiched by the locking members and the external wall 120a. Therefore, the light source 70A has a predetermined position relative to the core unit 120.

The laser beams emitted by the light sources 70A and 70B thus attached to the core unit 120 are incident on the polygon mirror 104 at a predetermined angle (30° in this embodiment) relative to the y axis as illustrated in FIG. 4.

Similarly to the light sources 70A and 70B, the light sources 70C and 70D are attached to the external wall 120b of the core unit 120. In addition, the laser beams emitted by the light sources 70C and 70D thus attached to the core unit 120 are incident on the polygon mirror 104 at a predetermined angle (−30° in this embodiment) relative to the y axis as illustrated in FIG. 4.

The optical units 102A and 102B are located on the light paths of the laser beams emitted by the light sources 70A/70B and 70C/70D, respectively, as illustrated in FIG. 4. Each of the optical units 102A and 102B includes plural optical elements such as coupling lenses configured to shape the incident laser beams so that the divergence angle of the incident laser beams is changed to a predetermined divergence angle; apertures configured to shape the laser beams such that the laser beams have a predetermined cross section; and cylindrical lenses configured to focus the laser beams on a deflecting plane of the polygon mirror 104. The laser beams thus shaped and incident on the polygon mirror 104 are then subjected to deflection scanning by the polygon mirror in the Y direction.

As illustrated in FIG. 4, the polygon mirror 104 is located at the center of core unit 120 and rotates on an axis parallel to the Z axis. The polygon mirror 104 has two quadratic prisms, which are arranged side by side in the Z direction and each of which has deflection planes on the side surfaces thereof, wherein the deflection planes of one of the two quadratic prisms are different at an angle of 45° in phase from the deflection planes of the other of the two quadratic prisms. The polygon mirror 104 is rotated on an axis parallel to the Z axis by a rotating mechanism (not shown).

The laser beam emitted by the light source 70A and incident on the upper quadratic prism of the polygon mirror 104 and the laser beam emitted by the light source 70B and incident on the lower quadratic prism of the polygon mirror 104 are subjected to deflection scanning by the respective quadratic prisms in the +Y direction while the phases of the laser beams are different from each other. Similarly, the laser beam emitted by the light source 70C and incident on the upper quadratic prism of the polygon mirror 104 and the laser beam emitted by the light source 70D and incident on the lower quadratic prism of the polygon mirror 104 are subjected to deflection scanning by the respective quadratic prisms in the −Y direction while the phases of the laser beams are different from each other.

The scanning lenses 105A and 105B are respectively located on the −X and +X sides of the polygon mirror 104. Each of the scanning lenses 105A and 105B has a height proportional to the incident angle of the deflected laser beam and is configured to move the laser beam, which is deflected by the polygon mirror so as to have a predetermined angular velocity, at a constant speed relative to the Y axis. The laser beams passing the scanning lenses are radiated from openings formed on the side surfaces of the housing of the core unit 120 in a direction parallel to the XY plane.

An example of the subunit 110 illustrated in FIG. 3 includes a pair of side plates 111 and 112, which extend in the X direction and which is prepared by a sheet metal processing method or the like method, and five connecting members 113 connecting the side plates 111 and 112.

Each of the side plates 111 and 112, which is prepared, for example, by subjecting a metal plate to sheet metal processing, has plural openings. In addition, as illustrated in FIG. 3, the side plate 112 has a rectangular recessed portion in the center thereof, and a part of the rectangular recessed portion is folded to form a folded portion 112a, which extends in a direction perpendicular to the side plate 112.

The connecting members 113 have a U-form cross section, and the ends of the members in the longitudinal direction thereof are fixed with the side plates 111 and 112, respectively. Therefore, the side plates 111 and 112 are connected so as to be parallel to each other.

Figure 11:
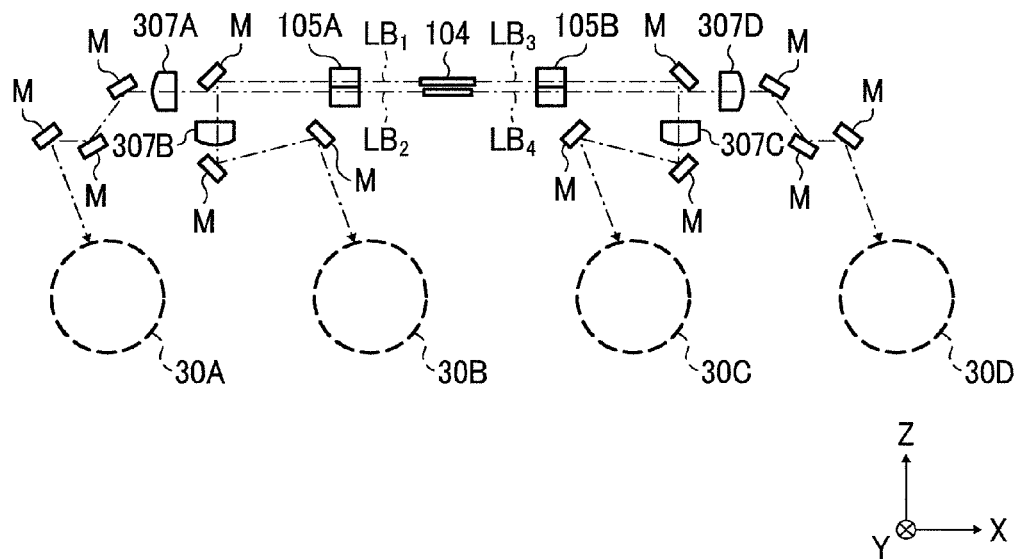
FIG. 11 is a view illustrating the layout of the scanning optics system.

The sub unit 110 having such a housing includes four scanning lenses 307A-307D and plural mirrors M as illustrated in FIG. 11. As illustrated in FIGS. 2 and 3, the core unit 120 is united with the sub unit 110. Specifically, the lower surface of the core unit 120 is supported by the folded portion 112a of the side plate 112, and the −Y side of the core unit 120 is fixed to the side plate 111 using a screw bolt or the like.

FIG. 11 illustrates the scanning optics system, which guides the laser beams reflected by the polygon mirror 104 to the photoreceptor drums 30. In this embodiment, by integrating the core unit 120 and the sub unit 110, the scanning optics system is established. In this scanning optics system, a laser beam $LB_1$, which is emitted by the light source 70A and then deflected by the polygon mirror 104, is focused on the surface of the photoreceptor drum 30B through the first scanning lens 105A, second scanning lens 307B, and mirrors M. Similarly, a laser beam $LB_2$, which is emitted by the light source 70B and then deflected by the polygon mirror 104, is focused on the surface of the photoreceptor drum 30A through the first scanning lens 105A, second scanning lens 307A, and mirrors M. In addition, a laser beam $LB_3$, which is emitted by the light source 70C and then deflected by the polygon mirror 104, is focused on the surface of the photoreceptor drum 30C through the first scanning lens 105B, second scanning lens 307C, and mirrors M. Further, a laser beam $LB_4$, which is emitted by the light source 70D and then deflected by the polygon mirror 104, is focused on the surface of the photoreceptor drum 30D through the first scanning lens 105B, second scanning lens 307D, and mirrors M.

Next, the image forming apparatus 500 equipped with the optical scanning device 100 having the above-mentioned configuration will be explained. Since the image forming processes performed in the first to fourth stations are the same, one of the color image forming processes will be explained while the suffixes A, B, C and D are omitted from the reference numbers.

When image information is sent to the image forming apparatus from a host device, the light source 70 emits laser beams. The laser beams are incident on the deflection surface of the polygon mirror 104 through the optical unit 102 so as to be subjected to deflection scanning. The deflected laser beams are then focused on the photoreceptor 30 by the scanning optics system.

The photoreceptor 30 has a photosensitive layer. When the charger 32 charges the photoreceptor 30 by applying a voltage thereto, the photosensitive layer has a charge with a uniform charge density. When the photoreceptor 30 is scanned with laser beams as mentioned above, the irradiated portions of the photosensitive layer become electroconductive, and therefore the irradiated portions have a potential near zero. Since the photoreceptor drum 30 is scanned with laser beams modulated on the basis of the image information while rotated in the direction indicated by the arrows in FIG. 1, an electrostatic latent image, in which the potential is changed depending on the amount of light irradiating the photosensitive layer, is formed on the photoreceptor.

The electrostatic latent image thus formed on the photoreceptor 30 is developed by a toner, which is supplied to the photoreceptor by the developing roller of the developing device 33. In this regard, a voltage with a polarity opposite to the polarity of the charge on the photoreceptor 30 is applied to the developing roller, and the toner adhered to the developing roller has a charge with the same polarity as that of the charge on the photoreceptor. Therefore, the toner is not adhered to the non-irradiated portion having a high potential, and is adhered to the irradiated portions, resulting in formation of a toner image on the photoreceptor 30.

The color toner images thus formed on the photoreceptor drums 30A-30D in the first to fourth stations are transferred one by one onto the transfer belt 40 while overlaid, resulting in formation of a combined color toner image. The combined color toner image on the transfer belt 40 is then transferred onto a sheet of the receiving material 61, which has been fed from the receiving material tray 60, by the transfer charger 48. The combined color toner image is then fixed on the receiving material sheet 61 by the fixing rollers 50. The receiving material sheet 61 bearing the fixed image thereon is then discharged to the discharge tray 501a by the discharging roller 58.

As mentioned above by reference to FIG. 8, in this embodiment each of the light sources 70A-70D is attached to the housing of the core unit 120 such that the notch 70d formed on the stem portion 70b of the light source overlaps with the notch 121b formed on the engaging portion 121 of the housing of the core unit 120. In this case, by inserting the slotted screwdriver 90 into a space formed by the notch 70d and the notch 121b and rotating the screwdriver, the angle of the light source, which is engaged with the engaging portion 121, can be adjusted. Therefore, the photoreceptor drums 30 can be scanned with laser beams in which beam pitches can be well adjusted, resulting in formation of well reproduced electrostatic latent images (i.e., formation of high definition electrostatic latent images).

In this embodiment, after the light sources 70A-70D are attached to the housing of the core unit 120 and the angle of each of the light sources is adjusted, the holding members 72 are attached to the housing. In this case, the notches 70d of the stem portions 70b of the light sources 70A-70D and the notches 121b of the engaging portions 121 can be accessed through the openings 72a of the holding members 72. Therefore, even after the holding members 72 are attached to the core unit 120, the angle of each of the light sources can be adjusted by inserting the slotted screwdriver 90 into the space formed by the notch 70d and the notch 121b through the opening 72a. In this case, the screws 73 are loosened if necessary.

In addition, in this embodiment the notches 121b pass through the external wall 120a, but the shape of the notches is not limited thereto as long as the notches can lock the tip of the slotted screwdriver 90. For example, the notches 121b do not necessarily pass through the external wall 120a.

Further, in this embodiment two notches are formed on each of the engaging portions 121 and stem portions 70b, the number of the notches is not limited two. One or more notches can be formed thereon.

Next, a second embodiment will be explained by reference to FIGS. 12-14. In this regard, the parts used for the first embodiment have like reference characters in this second embodiment, and such parts are not explained or are briefly explained.

Figure 12:
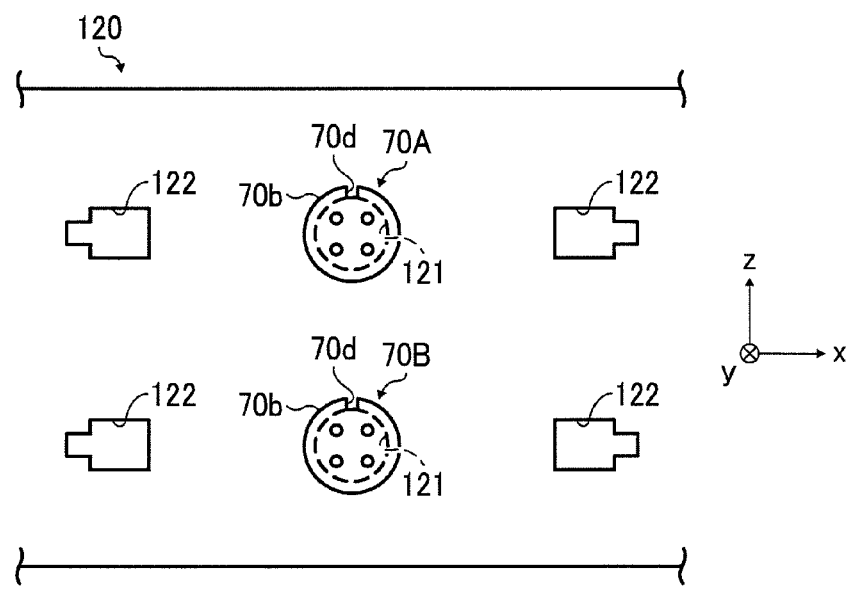
FIG. 12 illustrates the engaging portion of a second example of the optical scanning device of the present invention.

FIG. 12 illustrates the housing of the core unit 120 and the light sources 70A and 70B attached to the housing of the core unit 120. As illustrated in FIG. 12, the housing of the core unit 120 has stepped engaging portions 121 into which the stem portions 70b of the light sources 70A and 70B are inserted, and a T-form notch 122 which is formed on both sides of each of the engaging portions 121. In addition, the notch 70d, which has a rectangular form (unlike the form (V-form) of the notch 70d in the first embodiment), is formed on each of the stem portions 70b.

Figure 13:
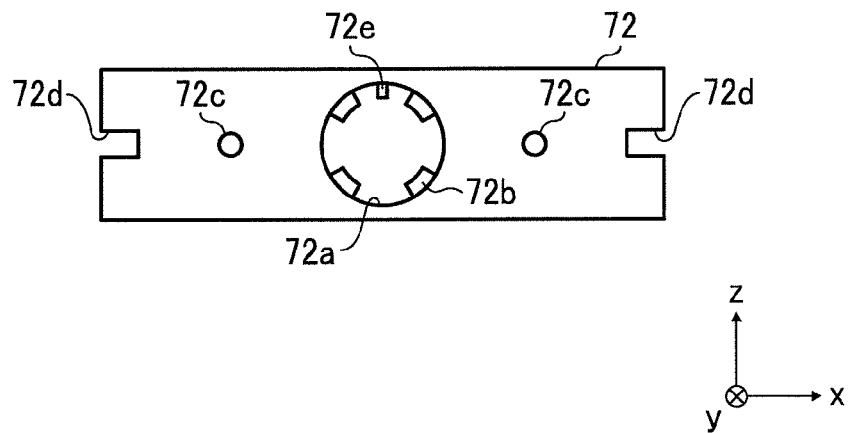
FIG. 13 is a plan view illustrating the holding member of the second example of the optical scanning device.
Figure 14:
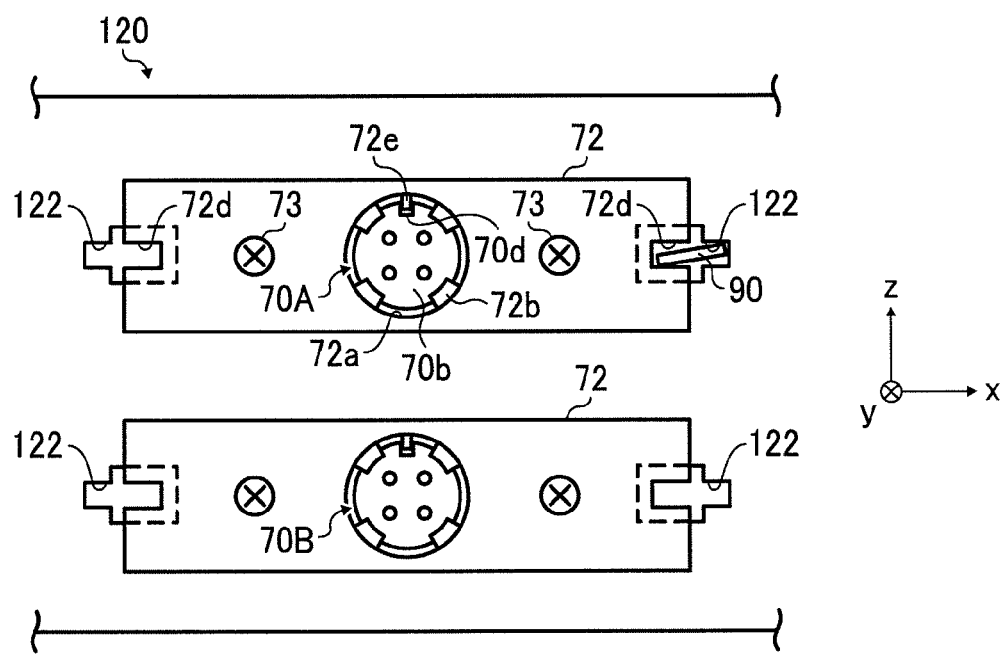
FIG. 14 is a view used for explaining how the light source is rotated in the second example of the optical scanning device.

FIG. 13 is a view illustrating the holding member 72 used for the second embodiment. Unlike the holding member used for the first embodiment, rectangular notches 72d are formed on both ends of the holding member 72 in the +x and −x directions. In addition, a projection 72e is formed on each of the openings 72a of the holding members 72 so as to be engaged with the notch 70d of the stem portion 70b of the light source 70. As illustrated in FIG. 14, the holding member 72 is attached to the housing of the core unit 120 with the screws 73 in such a manner that the projection 72e is engaged with the notch 70d of the stem portion 70b, and the stem portion 70b is inserted into the opening 72a of the holding member 72.

In this second embodiment the holding member 72 is attached to the housing of the core unit 120 while engaged with the light source 70. Therefore, the notches 72d formed on the holding member 72 are overlapped with the corresponding T-form notches 122 as illustrated in FIG. 14. By inserting the slotted screwdriver 90 into a space formed by the notch 72d and the notch 122 and rotating the screwdriver, the angle of the light source 70 can be adjusted via the holding member 72. Therefore, the optical scanning device can scan the photoreceptor drums 30A-30D with laser beams, whose pitches are adjusted with precision.

Figure 15:
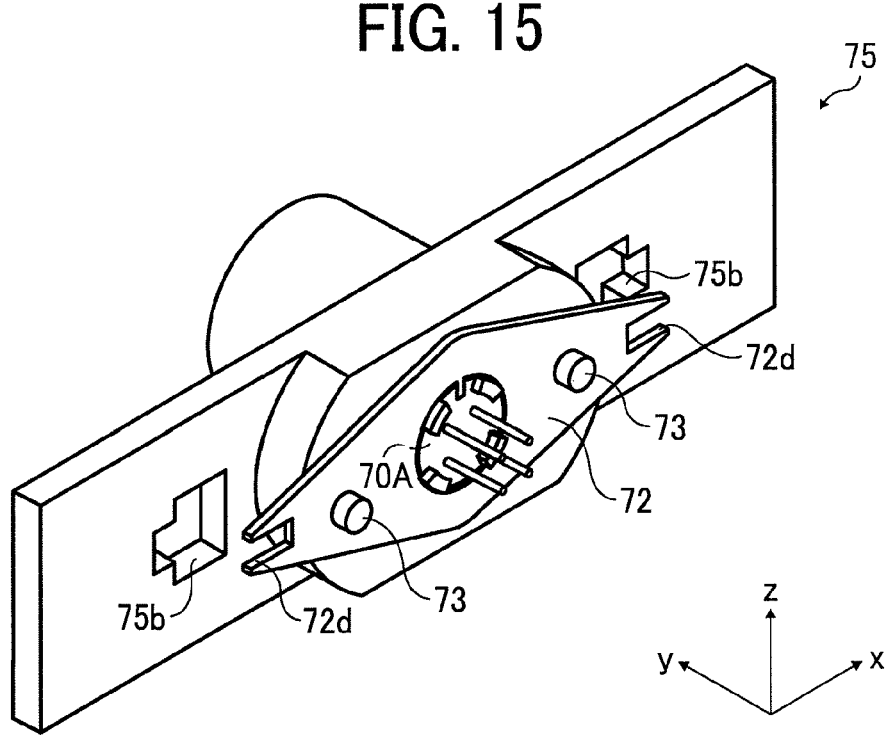
FIG. 15 is a perspective view illustrating a part (base member) of a third example of the optical scanning device of the present invention.

Next, the third embodiment of the image forming apparatus of the present invention will be explained by reference to FIGS. 15 and 16. As illustrated in FIG. 15, the light source 70A (i.e., each of the light sources 70A-70D) is supported by a base member 75 together with an optical element shaping a laser beam emitted by the light source.

The base member 75 is attached to the housing of the core unit 120.

Figure 16:
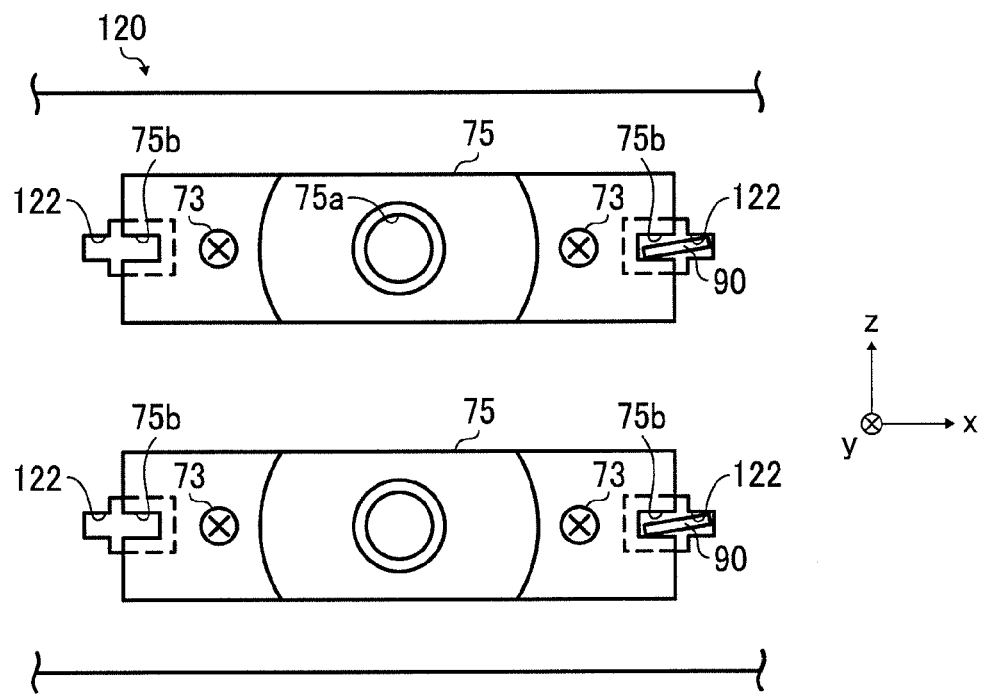
FIGS. 16 and 17 illustrate modified versions of the base member of the third example of the optical scanning device.

As illustrated in FIG. 16, the base member 75 has a stepped circular hole 75a. The light source 70 is attached to the base member 75 in such a manner that the stem portion 70b is inserted into the hole 75a. In addition, as illustrated in FIG. 15, the holding member 72, which has a form different from that of the holding member 72 used for the second embodiment but which has the same function as the holding member 72 used for the second embodiment, is attached to the base member 75 with the screws 73.

In this third embodiment, when the holding member 72 is attached to the base member, the notches 72d formed on the holding member 72 and T-form notches 75b formed on the base member 75 overlap in the x-y plane. In this case, by inserting the slotted screwdriver 90 into the space formed by the notch 72d and the notch 75b and rotating the screwdriver, the angle of the light source 70 can be adjusted via the base member 75. Therefore, the optical scanning device can scan the photoreceptor drums 30A-30D with laser beams, whose pitches are adjusted with precision.

In this third embodiment, the relationship between the light source 70 and the base member 75 may be the same as that between the light source 70 and the housing of the core unit 120. Namely, it is possible for this third embodiment to have configuration such that the light source 70 is directly rotated against the base member 75.

In this third embodiment, it is possible that notches 75b are formed on both ends of the base member 75 so that the relationship between the base member 75 and the housing of the core unit 120 is the same as that between the holding member 72 and the housing of the core unit 120. In this case, by inserting the slotted screwdriver 90 into the space formed by the notch 75b of the base member 75 and the notch 122 of the housing of the core unit 120 and rotating the screwdriver, the angle of the light source 70 can be adjusted via the base member 75.

Figure 17:
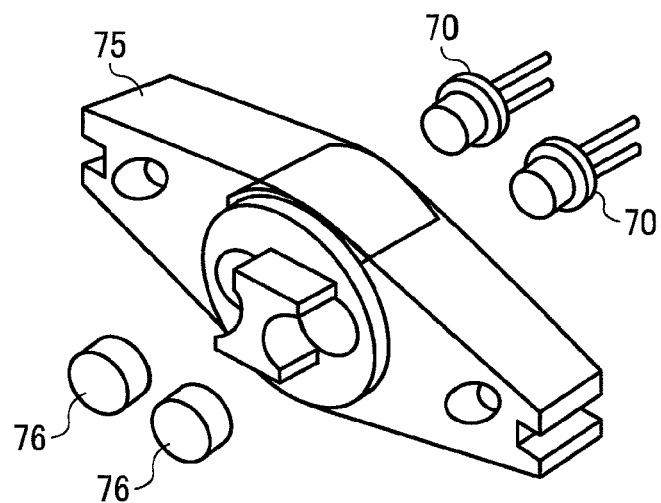

In this third embodiment, a case where only one light source is attached to the base member 72 has been explained. However, it is possible for the third embodiment that two or more of the light sources 70 are attached to one base member 75 together with the respective optical elements 76 as illustrated in FIG. 17.

In addition, in the above-mentioned embodiments the surface of the opening 72a of the holding member 72 is close to the lead terminal 70c of the light source 70. In order to prevent occurrence of an accident such that the light source is damaged due to contact of the lead terminal 70c with the holding member 72, it is preferable that the holding member 72 is made of an insulating material.

Further, in the above-mentioned embodiments the light sources 70, holding members 72, and base members 75 are attached to the housing of the core unit 120. However, it is possible to attach the light sources 70, holding members 72, and base members 75 to a supporting member other than the housing of the core unit 120.

Next, a fourth embodiment of the optical scanning device will be explained.

Figure 18:
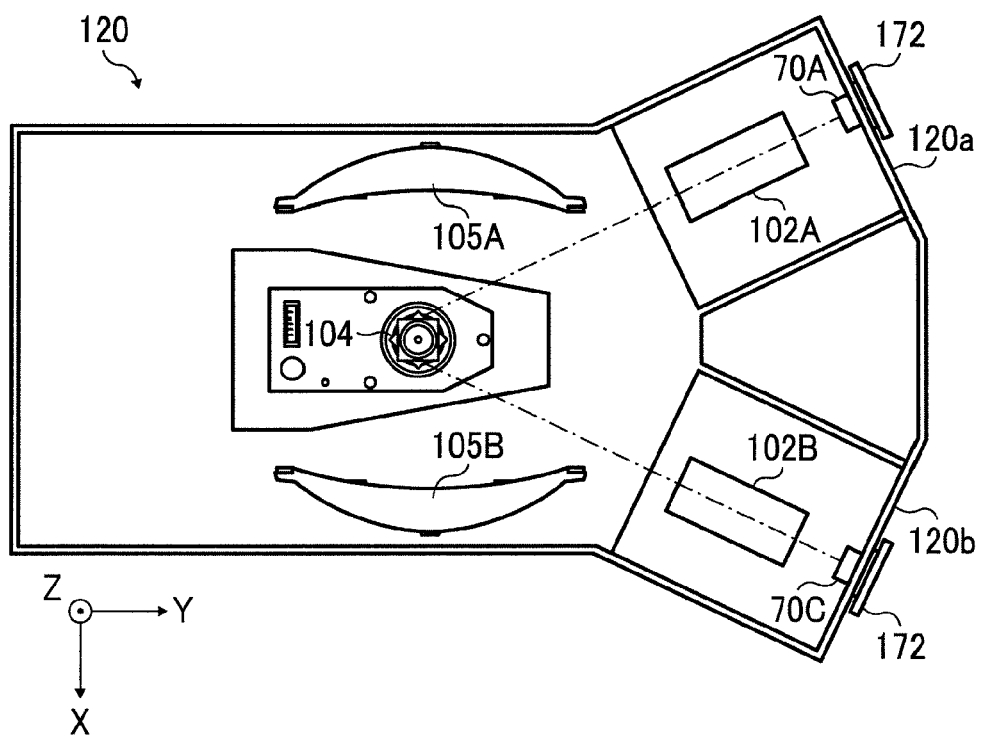
FIG. 18 is a plan view illustrating another example of the core unit of the optical system.

FIG. 18 is a plan view illustrating another example of the core unit 120. Referring to FIG. 18, the core unit 120 is made of an aluminum die casting including a first portion containing the polygon mirror 104, and the pair of scanning lenses 105A and 105B; and a second portion including optical units 102A and 102B. The core unit 120 has the two external walls 120a and 120b, each of which is slanted at an angle of 30° relative to the X-Z plane. Each of the light sources 70A and 70B is attached to the external wall 120a and each of the light sources 70C and 70D is attached to the external wall 120b using a holding member 172.

Hereinafter the fourth embodiment of the optical scanning device will be explained by defining the normal direction of the external wall 120b as a y-direction.

Figure 19:
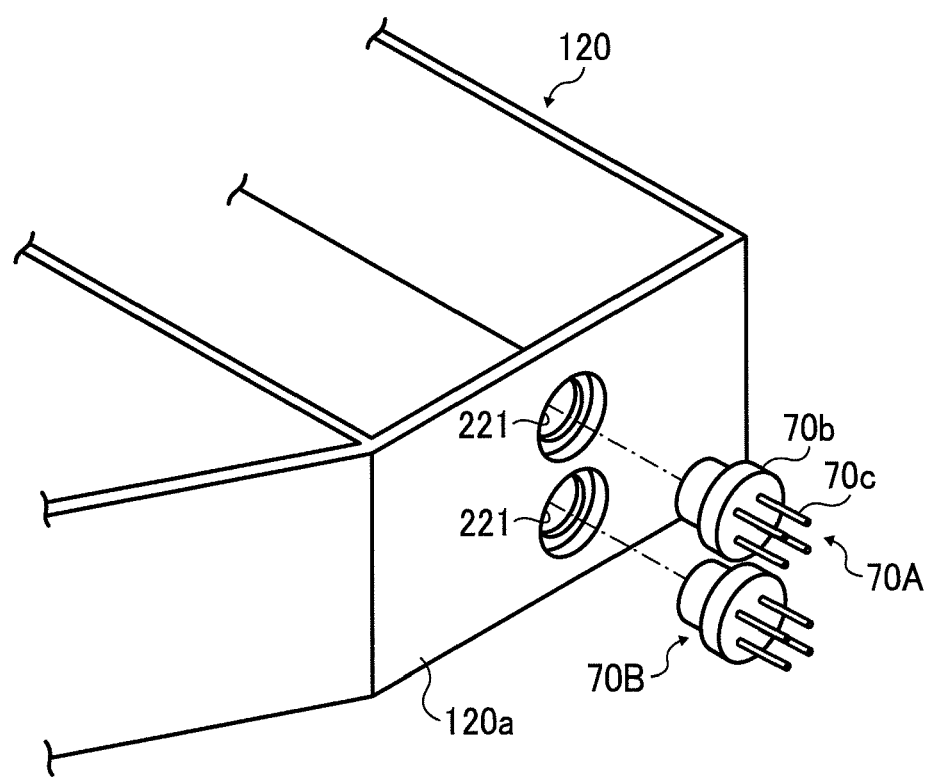
FIG. 19 is a view used for explaining the way to attach a second example of the light source to the housing of the core unit illustrated in FIG. 18.

Each of the light sources 70A and 70B is a multi-beam laser diode emitting two parallel laser beams. As illustrated in FIG. 19, each of the light sources 70A and 70B includes a cylindrical main portion, the disk-form stem portion 70b and four lead terminals 70c extending from the −y side of the stem portion to the +y side of the stem portion. As illustrated in FIG. 19, the light sources 70A and 70B are attached to the external wall 120a so as to be rotatable on an axis parallel to the y axis in such a manner that the stem portions 70b of the light sources are inserted into respective stepped circular openings 221a and 221a which are formed on the external wall 120a so as to be adjacent to each other in the z direction (i.e., sub-scanning direction).

Figure 20A:
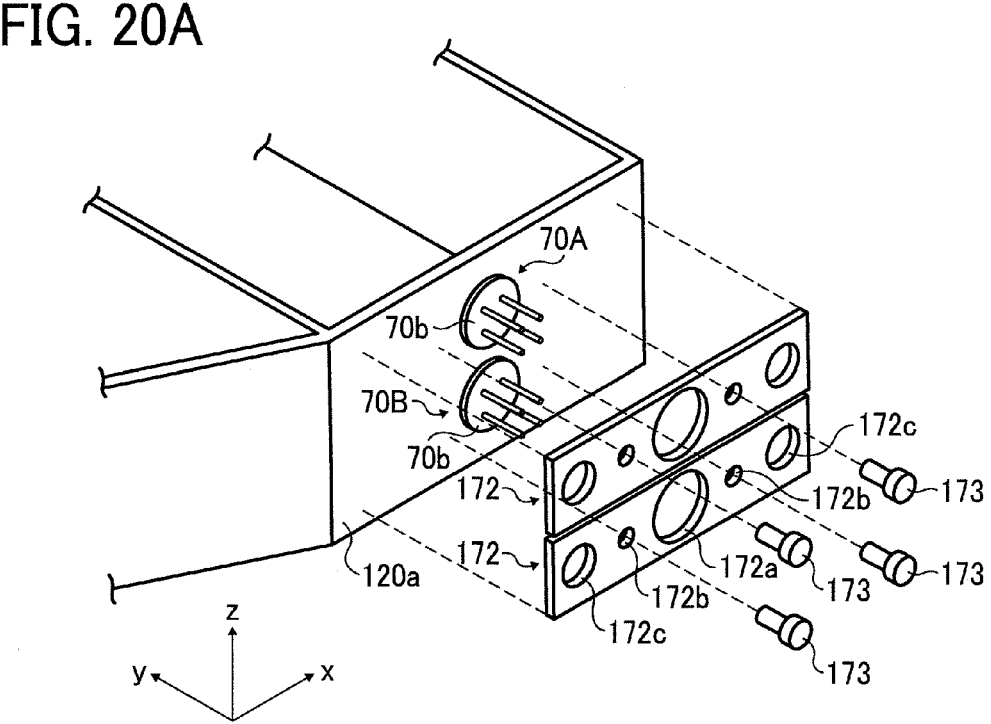
FIGS. 20A and 20B are views used for explaining the way to attach a holding member to the housing of the core unit illustrated in FIG. 18, to which the second example light source has been attached.

The holding member 172 is made of, for example, an elastic material such as plate springs. As illustrated in FIG. 20A, the holding member 172 is a member extending in a direction parallel to the x axis. The holding member 172 has a first circular opening 172a having a diameter smaller than the outer diameter of the stem portion 70b; second circular openings 172c, which have a slightly smaller diameter than the first circular opening 172a and which are formed on both end portions of the holding member 172 in the +x and −x directions; and third circular openings 172b, which have a smallest diameter and are located between the first circular opening 172a and the second circular openings 172c.

Figure 20B:
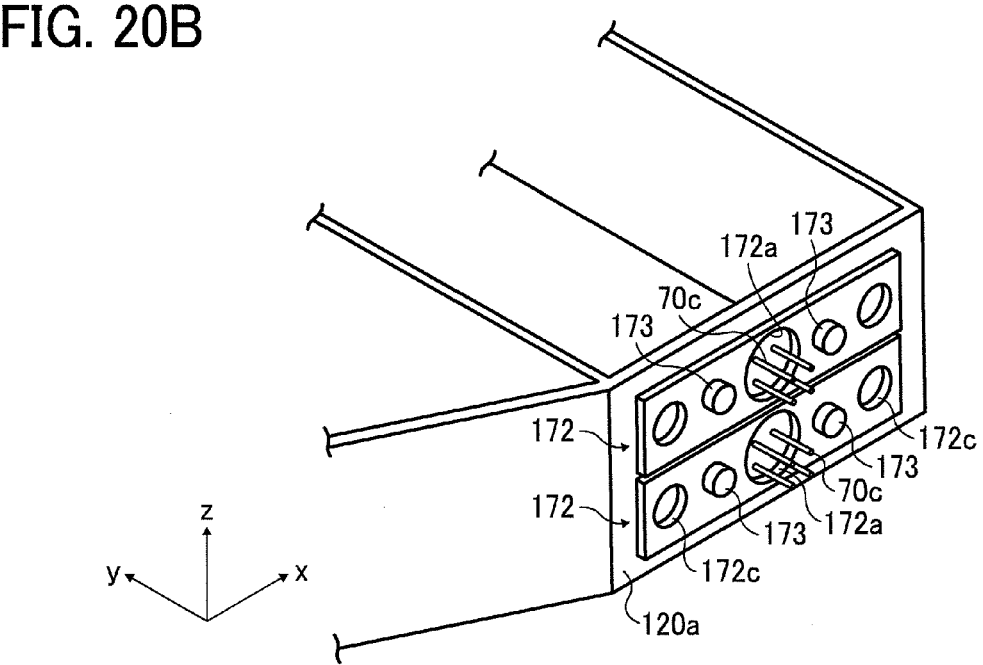
Figure 21:
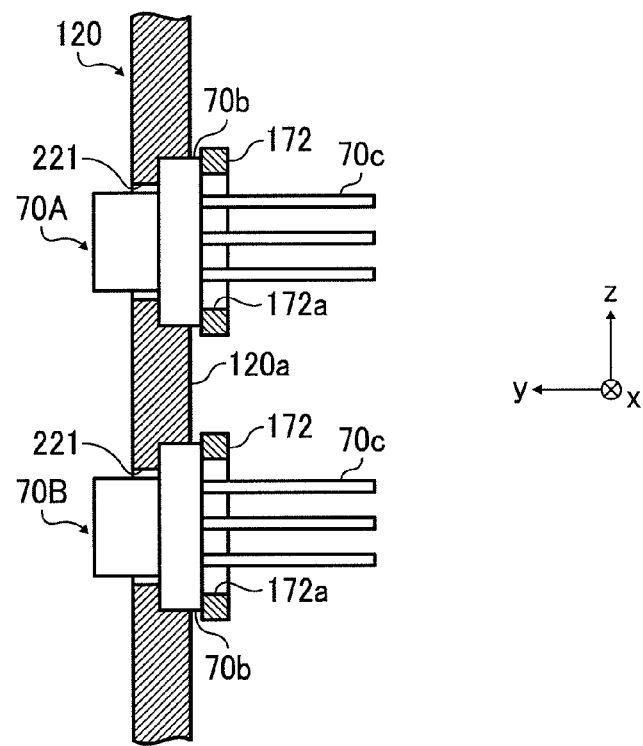
FIG. 21 is a view illustrating the second example light source and holding member attached to the housing of the core unit illustrated in FIG. 18.

It can be easily understood from FIGS. 20A and 20B that the holding members 172 are attached to the housing of the core unit 120 in such a manner that the lead terminals 70c of the light sources 70A and 70B are inserted into the corresponding openings 172a while the lead terminals 70c do not interfere with each other, and then the holding members 172 are attached to the external wall 120a with screws 173, which are inserted into the external wall from the −y side through the openings 172b. Thereby, the stem portion 70b of the light source 70 can be precisely positioned relative to the core unit 120 while sandwiched by the stepped portion of the opening 221 and the holding member 172 as illustrated in FIG. 21.

As illustrated in FIGS. 2 and 18, light beams are emitted by the light sources 70A and 70B at a predetermined angle (30° in this embodiment) relative to the Y axis, and the light beams are then incident on the polygon mirror 104.

Figure 22:
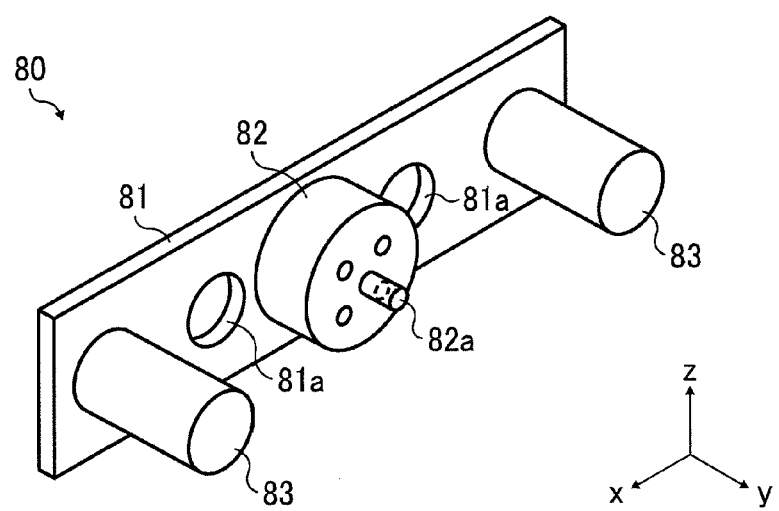
FIG. 22 is a perspective view illustrating an adjusting mechanism used for the second example light source.

In addition, an adjusting mechanism 80 is preferably attached to the light sources 70A and 70B thus positioned relative to the core unit 120. An example of the adjusting mechanism 80 is illustrated in FIG. 22. The adjusting mechanism 80 illustrated in FIG. 22 extends in the x direction, and has a base member 81 having a pair of openings 81a; cylindrical pins 83 extending from both end portions of the base member 81 in the +y direction; and a socket 82 located between the two pins. The socket 82 has four holes, into which the four lead terminals are to be inserted, on the +y side surface thereof; and a projection 82a extending from the center of the +y side surface thereof in the +y direction.

It can be easily understood from FIGS. 20 and 22 that the adjusting mechanism 80 is attached to each of the light sources 70A and 70B with the holding member 172 therebetween in such a manner that the pins 83 are inserted into the circular openings 172c of the holding member 172, and the lead terminals of the light source 70A and 70B are inserted into the holes of the socket 82. In this case, the light sources 70A and 70B are electrically connected with a driving system, which supplies a power to the light sources. In addition, the light sources 70A and 70B are pressed in the +y direction by the projection 82a formed on the socket 82.

Similarly to the light sources 70A and 70B, the light sources 70C and 70D are attached to the external wall 120b while arranged side by side in the sub-scanning direction (i.e., the z-axis direction). As illustrated in FIGS. 2 and 18, light beams are emitted by the light sources 70C and 70D at a predetermined angle (−30° in this embodiment) relative to the Y axis, and the light beams are then incident on the polygon mirror 104.

The thus emitted laser beams are guided to the photoreceptors in the same manner as mentioned above in the first embodiment.

Next, the method for adjusting the beam pitch in the image forming apparatus 500 using the fourth embodiment of the optical scanning device 100 will be explained.

As mentioned above by reference to FIGS. 9A and 9B, by rotating the light source 70 on an axis parallel to the y axis, the distance between the two emitting portions 70e can be changed from d1 to d2. By using this method, the beam pitch can be adjusted in this embodiment.

The angle adjustment is performed by measuring the pitch of laser beams emitted by one of the light sources 70 using an instrument such as CCD cameras, and positions sensors. The procedure is as follows. At first, the screw 73 fixing the holding member 172 to the housing of the core unit 120 is loosened. Specifically, a screw driver is inserted into the opening 81a of the base member 81 to rotate (loosen) the screw 73. Next, the base member 81 of the adjusting mechanism 80 is rotated while the beam pitch of the laser beams emitted by the light source 70 is measured with the instrument so that the beam pitch falls in the predetermined range. In this regard, the light source 70 is rotated via the socket 82. Next, the screw 73 is tightened to securely fix the holding member 172 to the housing of the core unit 120. Thus, the light source 70 is fixed while the angle thereof is adjusted.

This angle adjustment is performed on each of the light sources 70, resulting in completion of the beam pitch adjustment of the image forming apparatus.

As mentioned above, when image information is input from a host device to the image forming apparatus, the light sources 70 emit laser beams having a proper beam pitch to scan the photoreceptor drums 30 with the laser beams, resulting in formation of electrostatic latent images with precision on the photoreceptors. The image forming method in the fourth embodiment is the same as that mentioned above in the first embodiment.

As mentioned above, in this fourth embodiment the light sources 70A and 70B are attached to the external wall 120a of the core unit 120 while arranged to be adjacent to each other in the sub-scanning direction (i.e., z-axis direction), and the light sources 70C and 70D are attached to the external wall 120b of the core unit 120 while arranged to be adjacent to each other in the sub-scanning direction. Therefore, the optical scanning device 100 has a small size in the main scanning direction. In addition, each of the light sources 70A-70D can be rotated independently relative to the external wall. Therefore, the light sources 70A/70B and light sources 70C/70D can be arranged to be close to each other, resulting in miniaturization of the optical scanning device 100.

In addition, in this fourth embodiment the light sources 70A-70D are directly attached to the housing of the core unit 120. Therefore, it is not necessary to use a support member supporting the light sources, thereby reducing the number of parts, resulting in simplification of the optical scanning device.

In this fourth embodiment, the light sources 70A-70D can be rotated via the socket 82, and thereby the light sources attached to the housing of the core unit 120 can be easily rotated.

When the adjusting mechanism 80 is attached, the light sources 70A-70D are pressed by the projection 82a of the socket 82 to the housing of the core unit 120, and thereby the light sources can be securely positioned properly and the proper position can be stably maintained.

In a case where the light sources 70A-70D are fixed to the external walls 120a and 120b of the core unit 120 by pressing the holding member 172 with a socket without the projection 82a to press the light sources to the external walls, a problem in that the degree of parallelization of the light emitting surfaces of the light sources relative to the external walls deteriorates due to dimensional variations of the light sources, core unit and holding member tends to occur. When the light sources 70A-70D are subjected to the angle adjustment operation under such improper situation, the degree of parallelization is changed (to the desired parallelization) and thereby the angle between the light emitting surfaces of the light sources and the external walls is changed before and after the light sources 70A-70D are fixed, resulting in variation of the beam pitch.

In contrast, in this fourth embodiment the center potions of the backsides of the light sources 70A-70D are pressed to the external walls 120a and 120b with the projections 82a, and thereby the light sources 70A-70D are evenly pressed to the external walls 120a and 120b. Therefore, the angle between the light emitting surfaces of the light sources and the external walls is not changed before and after the light sources are fixed, resulting in prevention of variation of the beam pitch before and after the light sources are fixed (i.e., resulting in performance of angle adjustment with high precision).

In addition, in this fourth embodiment the surface of the circular opening 172a of the holding member 172 is close to the lead terminal 70c of the light source 70. In order to prevent occurrence of an accident such that the light source is damaged due to contact of the lead terminal 70c with the holding member 172, it is preferable that the holding member 712 is made of an insulating material.

In the above-mentioned four embodiments, each of the light sources 70 has two light emitting portions, but the light source is not limited thereto. Each of the light sources 70 may have three or more light emitting portions.

Furthermore, in the above-mentioned four embodiments the optical scanning device 100 separately includes the core unit 120 and the sub unit 110. However, the optical scanning device 100 may have a combination unit in which the core unit 120 is integrated with the sub unit 110, i.e., a housing of a combination unit of the core unit 120 and the sub unit 110.

In the above-mentioned image forming apparatus 500, electrostatic latent images are formed on the photoreceptor drums 30A-30D by laser beams which are emitted by the light sources 70A-70D such that the pitches of the laser beams are well adjusted in each light source, and visual images (toner images) are formed on the photoreceptor drums (and the receiving material 61) according to the electrostatic latent images. Therefore, high definition images can be formed on a receiving material.

In the above-mentioned embodiments, the optical scanning device 100 can be miniaturized, and thereby the image forming apparatus 500 can also be miniaturized.

In the above-mentioned embodiments, the image forming apparatus 500 produces multi-color images using plural photoreceptor drums 30A-30D. However, the image forming apparatus is not limited thereto, and an image forming apparatus having one photoreceptor can also be used for the present invention. In this case, the photoreceptor is scanned with plural laser beams to form electrostatic latent images and the latent images are developed with color toners or a toner to produce color images or monochrome images.

In the above-mentioned embodiments, the optical scanning device 100 of the present invention is used for a printer. However, the optical scanning device 100 can be used for other image forming apparatus such as copiers, facsimiles, and multi-function image forming apparatus having two or more of copying, facsimileing and printing functions.

Additional modifications and variations of the present invention are possible in light of the above teachings. It is therefore to be understood that within the scope of the appended claims the invention may be practiced other than as specifically described herein.

This document claims priority and contains subject matter related to Japanese Patent Applications Nos. 2008-237781 and 2008-237784, each filed on Sep. 17, 2008, the entire contents of which are herein incorporated by reference.

What is claimed is:

1. An optical scanning device for scanning an object with plural laser beams, the optical scanning device comprising:
a light source configured to emit plural parallel laser beams in a predetermined direction, wherein the light source has a stem portion having a first notch;
a support which has an opening with which the light source is engaged so that the light source is rotatable through a plurality of angles on an axis parallel to the plural laser beams, wherein the support comprises a second notch located on a part of the support so as to overlap with the first notch, the overlapping first and second notches being configured to allow a tool to be inserted through the first and second notches and rotated to rotate the light source from an original angle to an adjusted angle, the adjusted angle being any one of the plurality of angles; and
a holding member configured to secure the light source at the adjusted angle.

2. The optical scanning device according to claim 1, further comprising:
a scanning optics system including a deflecting member configured to deflect the plural laser beams in a main scanning direction; and
a housing containing the scanning optics system therein, wherein the support is the housing.

3. The optical scanning device according to claim 1, further comprising:
an optics system configured to shape the plural laser beams, wherein the support supports the optics system.

4. The optical scanning device according to claim 1, wherein the holding member has an opening through which the overlapped first and second notches are accessible.

5. The optical scanning device according to claim 4, wherein the holding member is attached to the support with a screw.

6. The optical scanning device according to claim 4, wherein the holding member consists essentially of an insulating material.

7. The optical scanning device according to claim 4, wherein the opening in the holding member is configured to permit a screwdriver access to the overlapped first and second notches.

8. The optical scanning device according to claim 1, wherein the first notch is a V-form notch.

9. The optical scanning device according to claim 1, wherein the second notch is a T-form notch.

10. The optical scanning device according to claim 1, the light source further comprising a third notch on an opposite side of the stem portion, and the support further comprising a fourth notch, which is located on the support at an opposite side of the opening so as to overlap with the third notch.

11. The optical scanning device according to claim 10, wherein the third notch is a V-form notch.

12. The optical scanning device according to claim 10, wherein the fourth notch is a T-form notch.

13. The optical scanning device according to claim 1, wherein the first notch and the second notch are configured to receive a screwdriver when the first notch and the second notch overlap.

* * * * *